(12) United States Patent
Levy

(10) Patent No.: US 6,731,324 B2
(45) Date of Patent: May 4, 2004

(54) VIDEO TELECONFERENCING ASSEMBLY AND PROCESS

(76) Inventor: William W. Levy, 1314 Marquette Ave., Suite 3306, Minneapolis, MN (US) 55403

(*) Notice: Subject to any disclaimer, the term of this patent is extended or adjusted under 35 U.S.C. 154(b) by 87 days.

(21) Appl. No.: 10/132,963

(22) Filed: Apr. 26, 2002

(65) Prior Publication Data

US 2002/0113863 A1 Aug. 22, 2002

Related U.S. Application Data

(63) Continuation-in-part of application No. 09/195,781, filed on Nov. 18, 1998.

(51) Int. Cl.[7] .......................... H04N 7/14; H04M 11/00
(52) U.S. Cl. .............................. 348/14.08; 379/106.02; 600/300
(58) Field of Search .......................... 348/14.01–14.04, 348/14.07–14.09, 14.1; 455/3.1, 4.1, 5.1, 6.1–6.3; 725/86, 105; 370/260–263; 600/300; 379/106.02; 345/753

(56) References Cited

U.S. PATENT DOCUMENTS

| | | |
|---|---|---|
| 5,441,047 A | 8/1995 | David et al. |
| 5,495,284 A | 2/1996 | Katz |
| 5,585,839 A | 12/1996 | Ishida et al. |
| 5,687,717 A | 11/1997 | Halpern et al. |
| 5,802,256 A | 9/1998 | Heckerman et al. |
| 5,961,446 A | 10/1999 | Beller et al. |
| 6,046,761 A | 4/2000 | Echerer |
| 6,449,001 B1 * | 9/2002 | Levy et al. .............. 348/14.08 |

* cited by examiner

Primary Examiner—George Eng
(74) Attorney, Agent, or Firm—Anthony G. Eggink

(57) ABSTRACT

An assembly and process for video telecommunication between a host site and a remote site for medical applications. The host site and remote site have computer assemblies constructed and arranged to form a computerized video telecommunications system between them. The remote site includes medical apparatus and procedures having visual and/or audio recognition systems whereby training, service, troubleshooting and instrument installation assistance can be conducted from the host site. The video telecommunication system at the host and remote sites include networking software for the communication of audio and visual signals between the sites. The communication between the host site and remote site may be direct communication or communication over the internet. The communication link between the host site and remote site may include an analog telephone line, a digital telephone line, an analog wireless network, a digital wireless network, a fiber optic cable, a satellite transmission network, an electromagnetic wave network, a graviton radiation wave network and a radio frequency wave network.

27 Claims, 3 Drawing Sheets

VIDEO TELECONFERENCING ASSEMBLY AND PROCESS

This application is a continuation-in-part of Applicant's co-pending application U.S Ser. No. 09/195,781, filed Nov. 18, 1998 and titled Video Teleconferencing Assembly and Process, which application is pending, and which is incorporated by reference herein.

BACKGROUND OF THE INVENTION

This invention relates generally to video teleconferencing assemblies and processes and more particularly to video teleconferencing assemblies and processes relating to medical, analytical and research applications. The video teleconferencing assemblies and processes relate to computer based services in present time and which include training, diagnostic and repair services for medical equipment as well as to laboratory procedures. The assemblies and processes of the invention further relate to the repair, installation, calibration and operation at remote sites of equipment in other industries, for example, industrial machines, tools and equipment, industrial process equipment, telecommunication equipment, heavy construction equipment, agriculture, food processing, food service, electronic and packaging equipment and heating, vacuum and air conditioning equipment and the like.

The assemblies of this invention include a host site and a remote site and between which information is relayed via a telecommunication link, such as via the internet, satellite point to point relay, satellite network relay, electromagnetic (EM) wave transmission, graviton radiation wave transmission or via radio frequency (RF) wave transmission, for example. The invention relates particularly to video duplexing (i.e., receiving and sending information concurrently) and is adapted to provide diagnostic services for servicing various research devices, medical equipment and related processes, for example.

Presently, if equipment located at a remote area fails to perform properly, needs servicing, or is scheduled to be tested, a service technician, skilled in a particular art, is often required to travel to that remote location to diagnose the problem, order the parts, and repair and test the equipment. Travel and time considerations make this practice an expensive and time consuming procedure. The assembly and process of this invention overcome these problems and shortcomings and does so in a timely and efficient manner.

The present invention permits a party, such as an operator located at a host site, to directly communicate with a second party at a remote location via a telecommunication link. The telecommunications link may comprise a telephone line, a data line, a satellite connection, the internet, wireless communication, satellite point to point direct relay, satellite network relay, electromagnetic wave transmission, graviton radiation wave transmission, radio frequency wave transmission and other communication links and combinations thereof. This invention also permits multiple parties at both the host and remote sites to be in direct communication with each other.

The present invention includes the adaptation of a visual and audio recognition system in the medical application at the remote site. The visual and/or audio recognition systems are used with medical apparatus and laboratory procedures at the remote site. The recognition system is monitored at the host site. The apparatus may include or be connected to a modem so that data may be directly sent to the host site for monitoring and diagnostic purposes.

The assemblies and processes of this invention permit various services and procedures to be performed between two separated or distant sites. These services include: technical and application troubleshooting, instrument installation assistance, technique monitoring and training, and technical training. Further, this invention may be used for parts replacement assistance, instrument and parts identification, instrument performance verification, staff monitoring, client and staff counseling, and enhancement of sales and service capabilities. Examples of areas in which this assembly can be used include: diagnosing instrument malfunctions, determining misalignment and movement impairments for robotics applications, monitoring fluidic action in medical applications, diagnosing pressure or vacuum malfunctions and mechanical impairments, diagnosing and adjusting electronic circuitry, and diagnosing technical malfunctions of chemical reactions and dilution ratios.

An object of this invention is to provide to industrial, research and medical institutions as well as to industrial machine, tool and equipment, industrial process equipment, telecommunication equipment, heavy construction equipment, agriculture, food processing, food service, electronic and packaging equipment, and HVAC equipment entities, and the like, assemblies and processes adapted for dealing with various service applications. For example, the repair, installation, calibration, monitoring and operation of equipment, devices and processes in various industries may be serviced by the assemblies and processes of the present invention. Preferably, the technical service is available on a 24 hours per day basis. A medical application for the purposes of this invention includes medical apparatus and laboratory procedures. For example, medical instrumentation having robotic equipment, vacuum or pressurized fluid holding components, electronic circuitry, or chemical components or consumables may be monitored by the assembly and process of the invention.

Medical equipment areas and products within those areas for which the assembly and process of this invention may be used, include but are not limited to: Medical Products including cardiac monitors, gamma counters, lasers, peptide synthesizers, autoclaves, EKG, imaging equipment, operating tables, portable X-ray's, and the like; Research/Production products including atomic absorption, DNA extractors, DNA synthesizers, flow cytometers, freeze dryers, gamma counters, HPLC, mass spectrometers, microtomes, peptide synthesizers, autoclaves, cell counters, centrifuges, fermenters, LS counters, microplate readers, pilot plant equipment, RIA analyzers, and the like; Analytical products including atomic absorption, DNA extractors, DNA synthesizers, flow cyometers, freeze dryers, gamma counters, HPLC, mass spectrometers, microtomes, peptide synthesizers, autoclaves, cell counters, centrifuges, fermenters, LS counters, microplate readers, RIA analyzers, and the like; and General Laboratory Medical products including chemistry analyzers, coag analyzers, DNA extractors, DNA synthesizers, electrolyte analyzers, flow cytometers, gamma counters, HPLC, microtomes, autoclaves, blood gas analyzers, cell counters, centrifuges, densitometers, LS counters, RIA analyzers, imaging and radiology products and the like. The latter products and equipment including those having a c.p.u. and related peripheral computer devices, i.e., a modem, being exemplary, however, and other equipment in other fields may also be serviced according to the teachings of the present invention. The assembly and process of this invention can be used to analyze not only research and medical device problems, but may also include the chemicals (consumables and reagents) that are used to generate the test results for patients and which are used for quality assurance purposes.

SUMMARY OF THE INVENTION

This invention relates to video teleconferencing assemblies and processes between separated sites or distant physical locations for the purpose of providing particular services related to medical applications in present time. The invention includes a host site and a remote site and wherein specified equipment is located at each site for communication between the sites.

The host site assembly includes a computer, video and audio hardware and a communication link between the host and remote sites, such as via an internet connection, a satellite point to point direct relay, satellite network relay, electromagnetic wave transmission, graviton radiation wave transmission, radio frequency wave transmission and like communication connections. The computer preferably contains PCI bus architecture. Specific hardware and software are also used for video duplexing including a video input device, such as a camera in addition to a PCI video digitizing card. Finally, the invention may require an internet connection consisting of internet related hardware, software and services. The internet connection preferably uses an ISDN router/hub, DSL, cable modem, T-1000 or the like, a communications link such as an analog or digital telephone line, a network providing internet connectivity, and an internet service provider. The communication link utilized for the internet connection may include ISDN, T-1000, a satellite transmission, digital and analog lines, or the like. The communication link may also include lines having combinations of these connections. As discussed, the communication link may be established via satellite point to point direct relay, satellite network relay, electromagnetic wave transmission, graviton radiation wave transmission, radio frequency wave transmission and/or other communication connections which provide for the transmission of data, video and audio signals.

The host site further has reference materials relating to medical applications that are located and used at a remote site. The reference materials include information relating to various medical applications including medical apparatus and medical testing procedures used in medical laboratories. The medical applications are provided with visual and/or audio recognition systems that are recognized and analyzed at the host site.

The remote site assembly includes a computer, video and audio hardware, an internet connection or other communication link, such as a satellite direct relay or other transmission. Preferably, the remote site assembly is portable to enable setup of the assembly in proximity to the device or process that is the subject of the conferencing session. The video hardware also includes a portable video input device. The computer and internet connection or other communication is similar to and compatible with that of the host site.

The process of this invention involves the utilization of the computer assemblies located at the host and remote sites and includes a number of process steps. To conduct a video conferencing session, the host site is initially turned on and connected to the internet or to another communication link, such as satellite point to point direct relay, satellite network relay, electromagnetic wave, graviton radiation wave transmission or radio frequency wave transmission. The host system may identify the IP address and utilizes an operational video capture subsystem to perform video duplexing. Communication may be received in video and/or audio and carried out by informing the remote site assembly of the IP address of the receiving computer located at the remote site.

The computer assembly at the remote site includes an internet connection or the like via an ISP connection and/or means to establish a communication link via satellite point to point direct relay, satellite network relay or other transmission. Users may send calls to the host site's IP address by means of video and/or audio. Communication between the remote site and the host site is maintained via communication software, such as Netmeeting 2.0 or like software, for example.

The visual and/or audio recognition systems of the invention include visual indicators used in connection with medical apparatus and laboratory procedures. The visual and/or audio indicators are used to determine the status of medical applications at the remote site. A modem may also be connected to or incorporated into the medical application for transmitting data and/or other signals between the host and remote sites. For example, the visual indicators may include a plurality of colored lights, such as LED's. The visual and/or audio recognition systems may be internal or external to the medical apparatus.

These and other benefits of this invention will become clear from the following description by reference to the drawing.

DESCRIPTION OF THE PREFERRED EMBODIMENTS

Figure 1:
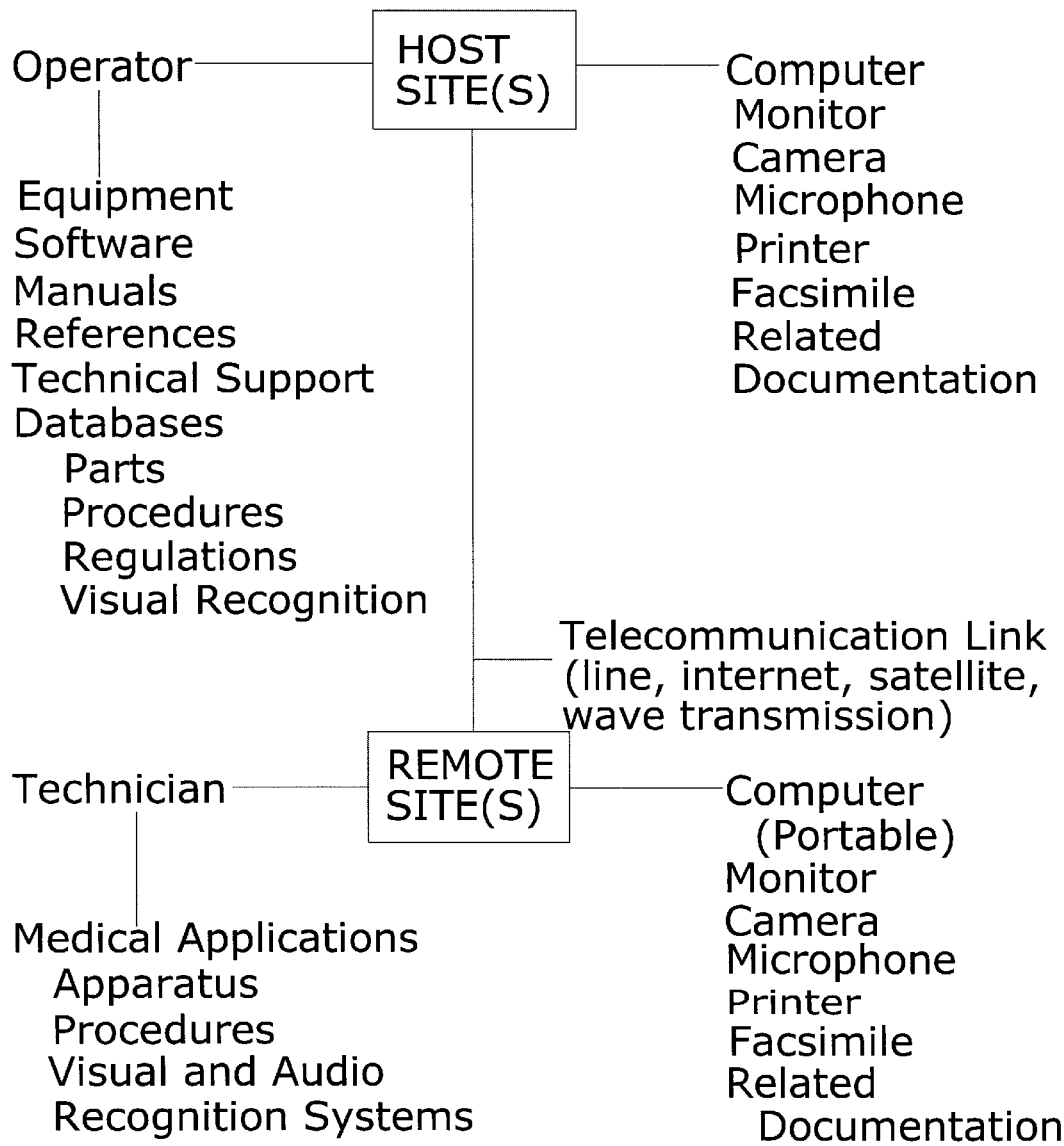
FIG. 1 is a schematic diagram showing the host site and the remote site as well as the equipment utilized at the respective sites.

As shown in FIG. 1 of the drawing, a schematic diagram is set forth showing the assemblies utilized in the present invention. FIG. 1 shows the host site and the remote site connected for communication, such as via the internet, via satellite point to point direct relay, via satellite network relay, via electromagnetic wave transmission, graviton radiation wave transmission or radio frequency wave transmission. The respective sites may be located in different countries for example, whereby an operator having access to various manuals and databases is able to communicate with a technician at the remote site. The communication between the host site and the remote site may be in present time, i.e., at least 30 frames /sec., however, this communication speed is not required for purposes of this invention. For example, communication between the sites at 15 frames per/sec. has been found suitable for purposes of practicing the teachings of this invention. The operator at the host site, in the U.S.A., for example, is able to communicate with a technician at a hospital or other person at a remote facility, in either the U.S.A. or in a country outside of the U.S.A. for example, and is able to instruct the technician to diagnose and repair a particular piece of equipment, for example. Initially, a business relationship may be entered into between the respective parties by means of an agreement sent via facsimile.

For example, it is customary and important under the laws and governmental regulations of various countries that proper agreements and service procedures be followed with respect to the servicing of specified equipment. The computer assemblies of this invention may include databases having specified contracts for service orders, for example. The operator at the host site may transmit the proper documentation to the remote site for signature and subsequently have the signed agreement of service order returned to the host site so that a contractual relationship has been entered into before any substantive services are provided.

FIG. 1 further shows that the operator at the host site has available for use various equipment, manuals, references, databases and a visual recognition system for performing the various services set forth herein. For example, the operator upon seeing the equipment at the remote site may consult an equipment manual, access a database and provide service information to the technician at the remote site or to other individual parties at the site. The verbal and visual information exchanged between the sites may include the use of similar operational devices, teaching aids and programmed procedural techniques at the host site so that the technician at the remote site may readily see and understand the proper operational parameters of the equipment or procedure at issue.

The assembly and process of the invention include the use of a visual and/or audio recognition system. A visual recognition system is a visual signal provided by a medical application located at the remote site that indicates to a host site technician a particular problem or the general condition of the device or process. The visual signal provided is such that the host site technician, for example, can easily identify it via the video teleconferencing system. The visual recognition systems may include a light or a plurality of lights which when activated relate to a specific condition. Further, a light or plurality of lights may flash in predetermined patterns to show the status of medical equipment. The visual recognition systems also include chemical reagents which appear one color if mixed correctly or another color if incorrectly mixed. The visual recognition system may be internal or external to the apparatus to be diagnosed. An audio recognition system relates to any sound that may be generated from the equipment, i.e., a buzzer.

The present invention may also use a direct link between the medical apparatus and the portable computer assembly, work station, laptop, computer on a cart, and the like at the remote site so that the host site can analyze the readings/data generated from the apparatus at the remote site. For example, pH, temperature, signal input and output, voltage, flow rates and the like may be monitored directly at the host site to diagnose a piece of equipment. The latter readings and data being exemplary of data important to analyze medical equipment, however, it is within the purview of this invention to enable readings directly from medical apparatus to be input in the remote site assembly for transmission to the host site.

Figure 3:
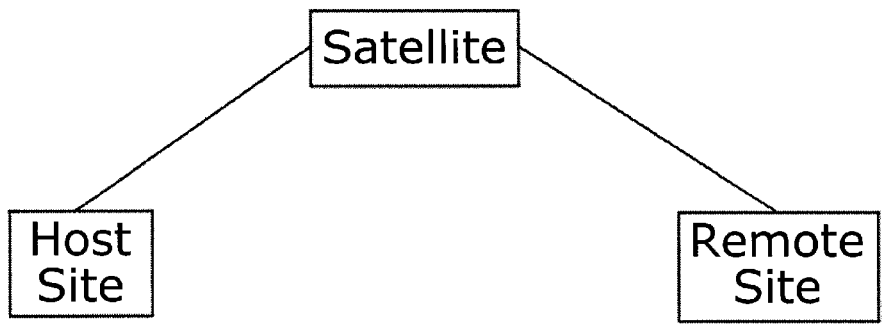
FIG. 3 is a schematic diagram showing a satellite point to point direct relay between the host site and the remote site.
Figure 4:
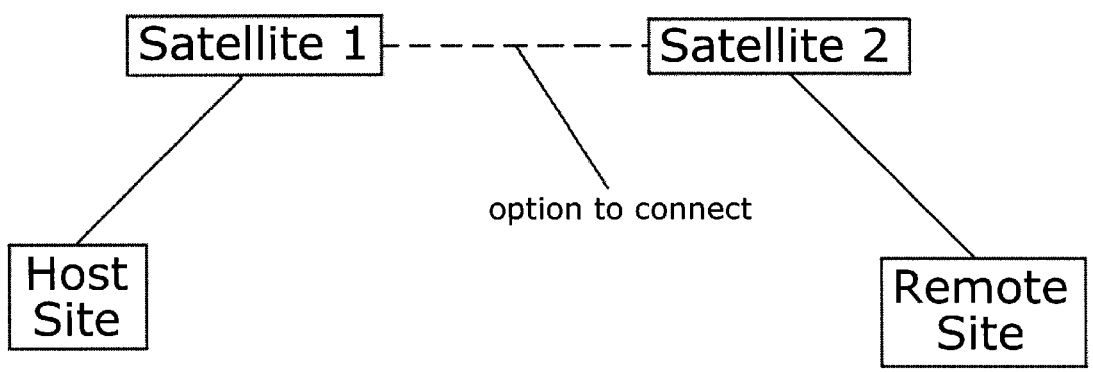
FIG. 4 is a schematic diagram showing a satellite network relay between the host site and the remote site.

The assembly and process of the present invention relates to video teleconferencing which may be conducted over the internet or other communication link such as a satellite point to point direct relay, satellite network relay and like connections. FIG. 3 is a schematic diagram which shows the assemblies at the host site and the remote site in communication via a satellite point to point direct relay communication link. FIG. 4 is a schematic diagram which shows the assemblies at the host site and the remote site in communication via a satellite network relay communication link. The assembly of the invention includes a host site, having specified computer equipment, a remote site(s) also having specified computer equipment and a process for video teleconferencing between the respective sites.

An exemplary list of the equipment used at the host site, at the remote site and the process linking the respective sites are as follows (use of compatible or like equipment may be used in the teachings of this invention):

Host Site System Assembly

Computer

The computer system equipment for the host site may include the following:

A desktop computer with the following features

Windows 95/98/NT

16 MB RAM

772 MB HD

Windows compatible sound system

14" SVGA Color Display

PCI bus architecture

Additional Video Hardware—Only Necessary for Video Duplexing (Receiving and Sending).

For full duplexing of video (receiving and sending) the host computer system will also require the following additional video hardware:

A video input device such as a Toshiba Noteworthy Notebook CCD Camera

A PCI video digitizing card such as the Micro Video DC30

Internet Connection

The computer system preferably includes the following Internet related hardware, software, and services:

A dedicated ISDN router/hub such as the Ascend Pipeline 75.

A standard ISDN digital telephone line (an example of a communication link. Use of other communication links, as discussed above, are within the purview of this invention).

Microsoft TCP/IP network protocol configured for Internet connectivity (Explorer, Netscape or like compatible software may also be used).

An Internet Service Provider relationship (internet connection).

Communication Link (Alternative Connections)—Can be Utilized with or without Internet Connection.

Means for satellite point to point direct relay, satellite network relay connection, electromagnetic wave transmission, graviton radiation wave transmission and radio frequency wave transmission.

Remote Site Assembly

Computer

The computer system equipment for the remote site include the following:

A Notebook computer with the following features:

Windows 95/98/NT

16 MB RAM

772 MB HD

Windows compatible sound system 10.4" Active Matrix Display

2×PCMCIA Type II Expansion Slots

Additional Video Hardware

The computer will also use the following video hardware:

A portable video input device such as a Toshiba Noteworthy Notebook CCD Camera

A PCMCIA Type II video digitizing card such as the Toshiba Noteworthy Video Capture Card Internet Connection The computer system will also use the following Internet related hardware, software and services:

36.6 band modem (minimum)

standard analog telephone line (minimum)

Microsoft remote access configured for Internet connectivity

An Internet Service Provider relationship (internet connection)

Communication Link (Alternative Connection)—Can be Utilized with or without Internet Connection.

Means for satellite point to point direct relay, satellite network relay connection, electromagnetic wave transmission, graviton radiation wave transmission and radio frequency wave transmission.

The above list of computer equipment at the host and remote sites represent exemplary and minimum requirements for purposes of practicing the present invention. As is known, computer equipment, software, communication links and related devices may change rapidly and it is within the purview of this invention to utilize such computer equipment, software and related devices having added function, power and capacity.

The Process of Creating a Video Conferencing Session

Host Configuration and Process Steps

To set up a video conferencing session the host site creates the following computer environment:

1. All local computers and routers are powered on;
2. Connection to the internet or other communication link, such as satellite connection is established;
3. Identifying the receiving (remote) system's IP address;
4. Initiate the video capture subsystem, as identified above (video duplexing only)
5. Execute Microsoft Netmeeting 2.0 or above or the like;
6. Turn on receive calls with video/audio; and
7. Communicate to the remote site the IP address of the receiving computer.

Remote System Configuration and Process Steps

To set up a video conferencing session the remote system creates the following computer environment:

8. The notebook or work station computer is powered on;
9. Connection to the internet via ISP connection or other communication link, such as satellite connection is established;
10. Identifying the host system receiving system's IP address (as provided in step 7 above);
11. Ensure that the Notebook video capture subsystem is working correctly;
12. Execute Microsoft Netmeeting 2.0 or above or the like;
13. Turn on send calls with video/audio; and
14. In Netmeeting 2.0 or the like software initiate a communication session with the host system's IP address.

Functions and Purposes of the Assemblies and Processes

In summary, the assemblies and processes of the invention may be utilized to provide the following procedures which are often encountered in the medical equipment diagnostic field:

1. Technical and application troubleshooting;
2. Instrument installation assistance;
3. Technique monitoring and training;
4. Technical training;
5. Parts replacement assistance;
6. Instrument and parts identification;
7. Instrument performance verification;
8. Staff/personnel monitoring;
9. Client and staff counseling; and
10. Enhancement of sales and service capabilities.

Further, industrial, research and medical institutions are able to use the assemblies and processes of this invention for handling the services set forth above. The assemblies and processes can also be used to analyze not only medical device problems, but the chemicals (consumables, reagents) that are used to generate the test results for patients and quality control. It is within the purview of this invention that similar or like assemblies for the host and remote sites be usable for performing the processes of the invention.

Figure 2:
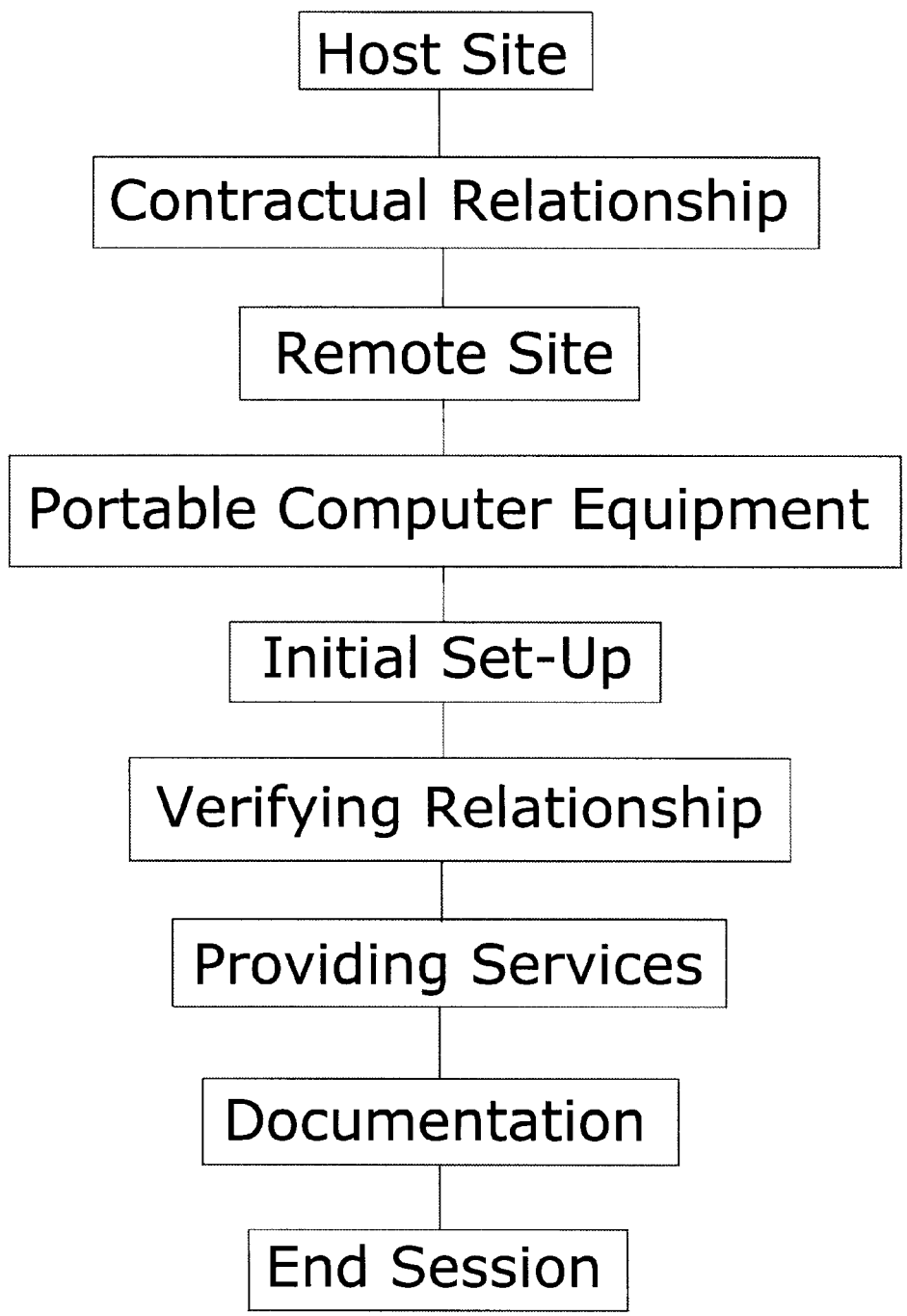
FIG. 2 is a schematic diagram showing the steps utilized between the host site and remote site(s) to practice the present invention.

FIG. 2 is a schematic diagram showing the steps utilized between the host site and the remote site(s) to practice the present invention. A typical sequence of events is as follows:

Step 1: Establish a Contractual Relationship

The Host Technical Service Center and a Remote Site having a medical or other application, or an intermediary of the Remote Site, engage in the formation of a contract to provide technical service with regard to the medical or other application. The Host Site may provide services to the Remote Site by contracting in any of a variety of ways.

If a Remote Site wants the equipment to stay at their facility, they can lease or rent the equipment and provide their own Remote System Operator. If a Remote Site does not want the equipment to stay at their facility, the Host can provide service by either sending an independent contractor, who leases or rents the equipment, to the remote site; send the equipment to a person in the Remote Site's area that is able to provide service under a single visit contract; or send the equipment with a Host employee to the Remote Site to provide service.

Step 2: Providing the Proper Equipment

The Host Technical Service Center (Host Site) has technical personnel, service information, and an audio-visual teleconferencing system (Host System). The Remote Site obtains a portable audio-video teleconferencing system (Remote System) that can communicate with the Host System. The Remote Site may obtain a temporary Remote System, provided by the Host Technical Service Center, that can be stored at the Remote Site indefinitely.

Step 3: Initial Set-Up

The Remote Site System Operator (Remote System Operator) sets up the Remote System in close proximity to the medical or other application that is to be the subject of the telecommunications session and establishes a connection between the Host System and the Remote System via a communications link, preferably over the Internet, via satellite point to point direct relay, satellite network relay, radio frequency wave transmission or other communication connection.

Step 4: Verifying the Contractual Relationship

Once the Remote System is set up, the Remote System Operator confirms that a contractual relationship is in effect. This can be accomplished via telephone, facsimile, or via the audio-video telecommunications system once a communications connection is established. Host Site Personnel confirm the contract and authorize the service session to commence.

Step 5: Technical Services Provided

The Host Technician operating the Host System can provide a variety of services including: training, troubleshooting, and guidance on calibration and maintenance. These services are completed by providing instruction to the Remote Operator based upon the information available to the Host Technician at the Host Site, information conveyed from the Remote Operator and other Remote Site personnel via the linked audio-video telecommunications systems, and the Host Technician can see and hear the operation of the application via the linked audio-video telecommunications systems. Further, the Remote Site Operator can move the Remote System to give the Host Technician a different perspective which may aid the Host Technician in providing proper information to the Remote Site personnel.

Step 6: Documentation

As shown in FIG. 1, the equipment at the host site includes software. It is preferred that such software includes means to track and maintain history of the remote site and the equipment and procedures there located. As shown in FIG. 2, prior to sign off, all services that have been provided at the remote site are documented. Thus, a history and steps taken at any remote site is kept in the computer system at the host site. It is within the purview of the invention to maintain a PMI (Preventative Maintenance Inspection) docket in the software at the host site so that proper maintenance and/or verification procedures are indicated. At the direction of the host site, the latter information may be sent to or maintained on the remote site computer assembly.

Step 7: Ending the Session

Once services have been provided, the Remote System Operator disconnects the communications connection. The Remote System Operator then either moves the Remote System to a new medical or other application for which the current Remote Site needs assistance, stores the system away at the Remote Site, or reconfigures the device to be taken with the Operator. The device may then be shipped back to the Host Site or may be kept by the Operator until the next job depending on the arrangement between the Operator and the Host Site.

Although medical application services are discussed herein, the assemblies and processes of the invention may also be utilized to perform services relating to other applications, i.e., relating to the repair, installation, calibration and operation at remote sites of equipment in other industries, for example, industrial machines, tools and equipment, industrial process equipment, telecommunication equipment, heavy construction equipment, agriculture, food processing, food service, electronic and packaging equipment, and heating, vacuum and air conditioning equipment and the like.

In summary, the computer equipment and software equipment discussed herein are exemplary and compatible and like equipment and software may be used in the teachings of this invention. Further, the host site may be more than one in number, i.e., wherein two operators skilled in respective arts are networked to communicate with one or more remote sites. Furthermore, one or more host sites may simultaneously be linked to a plurality of remote sites i.e., to conduct a training session.

As many changes are possible to the embodiments of this invention utilizing the teachings thereof, the descriptions above, and the accompanying drawings should be interpreted in the illustrative and not the limited sense.

That which is claimed is:

1. A video telecommunications assembly for providing technical assistance for medical applications from a host site to a remote site comprising:

a) a host site having a computer assembly constructed and arranged to form a computerized video telecommunications system, said computer assembly having networking software, a sufficient amount of RAM memory to run said networking software, a hard drive having sufficient memory to run said networking software, having fax sending and receiving capabilities, a microphone, at least one speaker, a video input device, a video monitor, networking bus architecture, and a means to connect said computer assembly to a communication link, wherein said host site provides technical assistance to said remote site, wherein said technical assistance is selected from the group consisting of technical and application troubleshooting, instrument installation assistance, technique monitoring and training, technical training, parts and replacement assistance, instrument and parts identification, instrument performance verification, staff monitoring, client and staff counseling, enhancement of sales and service capabilities, and analyzing chemicals used to generate test results for patients and quality control;

b) a remote site having a computer assembly constructed and arranged to form a computerized video telecommunications system equipped with networking software compatible to said host site's networking software, a sufficient amount of RAM memory to run said networking software, a hard drive having sufficient memory to run said networking software, fax sending and receiving capabilities, a microphone, at least one speaker, a video monitor, a video input device, a video digitizing means, and a means to connect said computer assembly to said communication link;

c) a medical application at said remote site, said medical application comprising medical equipment having a recognition system or a laboratory procedure having a recognition system, said recognition system being in view of said video input device of said remote site computer assembly, whereby said recognition system indicates the operating status of said medical application for transmission from said remote site to said host site; and d) a communication link selected from the group of communication links consisting of an analog telephone line, a digital telephone line, an analog wireless network, a digital wireless network, a fiber optic cable, a satellite transmission network, an electromagnetic wave network, a graviton radiation wave network and a radio frequency wave network.

2. The assembly of claim 1, wherein said communication link between said host site and said remote site is established over the internet.

3. The assembly of claim 2, wherein said communication link is enhanced utilizing a dedicated ISDN router/hub, DSL, cable modem or a T-1000 line.

4. The assembly of claim 1, wherein said host computer assembly is further comprised of a PCI video digitizing card whereby said card enables said host computer assembly to send and receive information concurrently.

5. The assembly of claim 1, wherein said medical application is equipped with a computer modem.

6. The assembly of claim 1, wherein said recognition system is a visual recognition system comprised of a plurality of colored lights.

7. The assembly of claim 1, wherein said video input device is a portable or stationary digital video camera or a portable or stationary computer.

8. The assembly of claim 1, wherein said video telecommunications assembly has more than one remote site linked to said host site.

9. The assembly of claim 1, wherein said video telecommunications assembly has more than one host site linked to said remote site.

10. The assembly of claim 1, wherein said host site has technical reference materials and wherein said technical reference materials are comprised of medical application manuals, troubleshooting reference documents, medical applications, and databases for use by a host site technician in assisting remote site staff/personnel with technical procedures.

11. A video teleconferencing process for providing technical support services between a host site and a remote site, comprising the steps of:
   a) providing at least one host technical service center equipped with a computer, networking software, and a communication link adapted to form a computerized video teleconferencing system and wherein said communication link is selected from the group consisting of an analog telephone line, a digital telephone line, an analog wireless network, a digital wireless network, a fiber optic cable, a satellite transmission network, an electromagnetic wave network, a graviton radiation wave network and a radio frequency wave network;
   b) providing at the remote site, a medical application comprising medical equipment having a recognition system or a laboratory procedure having a recognition system, said recognition system indicating to a technician at the host status of said medical application;
   c) providing at least one computerized video teleconferencing system, set up at the remote site in view of said recognition system of said medical application, said teleconferencing system having means to communicate with said host site over said communication link;
   d) contacting said host site from said remote video teleconferencing system to request a teleconferencing session;
   e) having a host respond to said remote site request by setting up a video teleconferencing session between said host remote computer system and said remote computer system;
   f) providing technical support services by having host technical support personnel interpret the recognition system generated by said medical application at said remote site via said video teleconferencing session and analyzing said recognition system output using said reference materials to provide assistance to said remote site personnel; and
   g) providing technical assistance to said remote site wherein said technical assistance is selected from the group consisting of technical and application troubleshooting, instrument installation assistance, technique monitoring and training, technical training, parts and replacement assistance, instrument and parts identification, instrument performance verification, staff monitoring, client and staff counseling, enhancement of sales and service capabilities, and analyzing chemicals used to generate test results for patients and quality control.

12. The process of claim 11, providing fax sending and receiving hardware and software at said host and remote sites.

13. The process of claim 12, entering into a contract for services to be rendered through the process of faxing the contract from the host site to the remote site, having the party in need of technical support sign said contract, and having the remote site fax the signed copy to the host site.

14. The process of claim 11, wherein said video teleconferencing session is conducted over the internet, via a satellite point to point direct relay, via a satellite network relay, via an electromagnetic transmission network, via a graviton radiation wave transmission network or a radio frequency wave transmission network.

15. The process of claim 11, wherein said host site is provided with reference materials including medical equipment manuals, trouble shooting reference documents, sample equipment, or computer databases.

16. The process of claim 11, wherein said recognition system is a visual recognition system comprised of a plurality of lights.

17. The process of claim 16, wherein said visual recognition system is programmed whereby predetermined medical application problems are indicated by the activation of predetermined light patterns.

18. The process of claim 16, wherein said lights are colored and wherein a colored light pattern medical application troubleshooting code is programmed into the computer at the host site.

19. The process of claim 11, wherein said medical applications and laboratory procedures used at the remote sites are programmed into the computer at the host site.

20. The process of claim 11, further comprising the step of providing fax sending and receiving hardware and software at the host site and the remote site.

21. The process of claim 12, further comprising the step of authorizing said telecommunications session by faxing a request for authorization from the host site to the remote site and having the remote site fax a duly signed copy of the request for authorization back to the host site.

22. A method of performing technical assistance on medical applications comprising the steps of:
   a) forming a contractual relationship between a host technical service center and a remote site having medical applications to provide technical assistance to said remote site, wherein said technical assistance is selected from the group consisting of technical and application troubleshooting, instrument installation assistance, technique monitoring and training, technical training, parts and replacement assistance, instrument and parts identification, instrument performance verification, staff monitoring, client and staff counseling, enhancement of sales and service capabilities, and analyzing chemicals used to generate test results for patients and quality control;
   b) providing personnel at said host site with access to technical service information;
   c) providing host site with an audio-visual telecommunications system adapted to communicate with said remote site via a communication link;
   d) providing a communications link selected from the group of communication links consisting of an analog telephone line, a digital telephone line, an analog wireless network, a digital wireless network, a fiber optic cable, a satellite transmission network, an electromagnetic wave network, a graviton radiation wave network and a radio frequency wave;
   e) providing remote site with a audio-visual telecommunications system having audio and visual input devices and having the ability to communicate with said host site via said communication link, whereby said remote site system can be set up within camera range of said medical application;
   f) providing a remote site operator having the ability to set up and operate said remote site system, wherein said remote site operator is selected from the group of operators consisting of an employee of said host technical service center, an independent contractor, an employee of an entity having a service agreement with said host technical service center, a franchise of a host franchiser and an employee of the remote site wherein said remote site has an agreement with said host technical service center to maintain said remote site audio-visual telecommunications system on site; and wherein said remote operator sets up the system for operation;

g) establishing a communication connection between said host site and said remote site system via said communication link;

h) verifying that said contractual relationship is established;

i) having said host site personnel control the collection of information provided by the remote site system;

j) providing information to said remote site personnel via said audio-video telecommunications system from said host site, said host site using said information collected from said remote site and with information located at said host site providing technical guidance with respect to said medical application; and k) disconnecting said telecommunications connection.

23. The method of claim 22, wherein said audio-visual telecommunications system is a portable system or stationary system.

24. The method of claim 23, wherein the host site personnel control the collection of information by asking said remote site operator to manipulate the position of said audio-visual telecommunications system to said medical application with respect to its proximity to said application and the angle of said application for purposes of gaining a different perspective of said application.

25. A video telecommunications assembly for providing technical assistance comprising:

a) a host site having a computer assembly and technical reference materials, said computer assembly having networking software, fax sending and receiving capabilities, a microphone, at least one speaker, a video input device, a video monitor, networking bus architecture, and a means to connect said computer assembly to a communication link, wherein said host site provides technical assistance to said remote site, wherein said technical assistance is selected from the group consisting of technical and application troubleshooting, instrument installation assistance, technique monitoring and training, technical training, parts and replacement assistance, instrument and parts identification, instrument performance verification, staff monitoring, client and staff counseling, enhancement of sales and service capabilities, and analyzing chemicals used to generate test results and quality control;

b) a remote site having a computer assembly constructed and arranged to form a computerized video telecommunications system equipped with networking software compatible with said host site's networking software, fax sending a receiving capabilities, a microphone, at least one speaker, a video monitor, a video input device, a video digitizing means, and a means to connect said computer assembly to a communication link; and c) a communication link between said host site and said remote site, whereby said host site provides technical services to said remote site after said host site requests authorization to provide the technical services and the remote site authorizes the technical services, and wherein said communication link is selected from the group of communication links consisting of an analog telephone line, a digital telephone line, an analog wireless network, a digital wireless network, a fiber optic cable, a satellite transmission network, an electromagnetic wave network, a graviton radiation wave network and a radio frequency wave network.

26. An audio-video telecommunications method to enable a host site of a host technical service center to provide technical assistance to a remote site, said method comprising the steps of:

a) providing the host site with a computerized audio-video telecommunications system capable of communicating with the remote site via a communication link, wherein said host site provides technical assistance to said remote site, wherein said technical assistance is selected from the group consisting of technical and application troubleshooting, instrument installation assistance, technique monitoring and training, technical training, parts and replacement assistance, instrument and parts identification, instrument performance verification, staff monitoring, client and staff counseling, enhancement of sales and service capabilities, and analyzing chemicals used to generate test results and quality control;

b) providing a communication link selected from the group of communication links consisting of an analog telephone line, a digital telephone line, an analog wireless network, a digital wireless network, a fiber optic cable, a satellite transmission network, an electromagnetic wave network, a graviton radiation wave network and a radio frequency wave network;

c) providing the remote site with a computerized audio-visual telecommunications system capable of communicating with the host site via said communication link;

d) contacting the host site from said remote site system to request a telecommunications session;

e) having the host site request the remote site to authorize said telecommunications session;

f) having the remote site authorize said telecommunications session;

g) having the host site respond to said remote site authorization by setting up a telecommunications session between said host site system and said remote site system via said communication link;

h) communicating information to said host site system from said remote site system via said communication link;

i) communicating technical advice to said remote site system from said host site system via said communication link; and j) terminating said telecommunications session.

27. An audio-visual telecommunications method for a host site of a host technical service center to provide medical applications technical assistance to a remote site, said method comprising the steps of:

a) providing the host site with a computerized audio-visual telecommunications system capable of communicating with the remote site via a communication link, wherein said host site provides technical assistance to said remote site, wherein said technical assistance is selected from the group consisting of technical and application troubleshooting, instrument installation assistance, technique monitoring and training, technical training, parts and replacement assistance, instrument and parts identification, instrument performance verification, staff monitoring, client and staff counseling, enhancement of sales and service capabilities, and analyzing chemicals used to generate test results for patients and quality control;

b) providing a communication link selected from the group of communication links consisting of an analog telephone line, a digital telephone line, an analog wireless network, a digital wireless network, a fiber optic cable, a satellite transmission network, an electromagnetic wave network, a graviton radiation wave network and a radio frequency wave network;

c) providing the remote site with a computerized audio-visual telecommunications system capable of communicating with the host site via said communication link and a remote site operator selected from the group of operators consisting of an employee of the host technical service center, an independent contractor, an employee of a person having a service agreement with the host technical service center, and an employee of the remote site wherein the remote site has an agreement with the host technical service center to maintain said remote site system on site;

d) contacting the host site from said remote site system to request a telecommunications session;

e) having the host site request the remote site to authorize said telecommunications session;

f) having the remote site authorize said telecommunications session;

g) having the host site respond to said remote site authorization by setting up a telecommunications session between said host site system and said remote site system via said communication link;

h) continually communicating information about a medical application to said host site system from said remote site system via said communication link; and i) continually and interactively communicating technical advice about said medical application to said remote site system from said host site system via said telecommunications session.

* * * * *